July 8, 1952     E. W. FLOSDORF     2,602,825
SUBLIMATION PROCESS AND APPARATUS
Filed Jan. 24, 1948
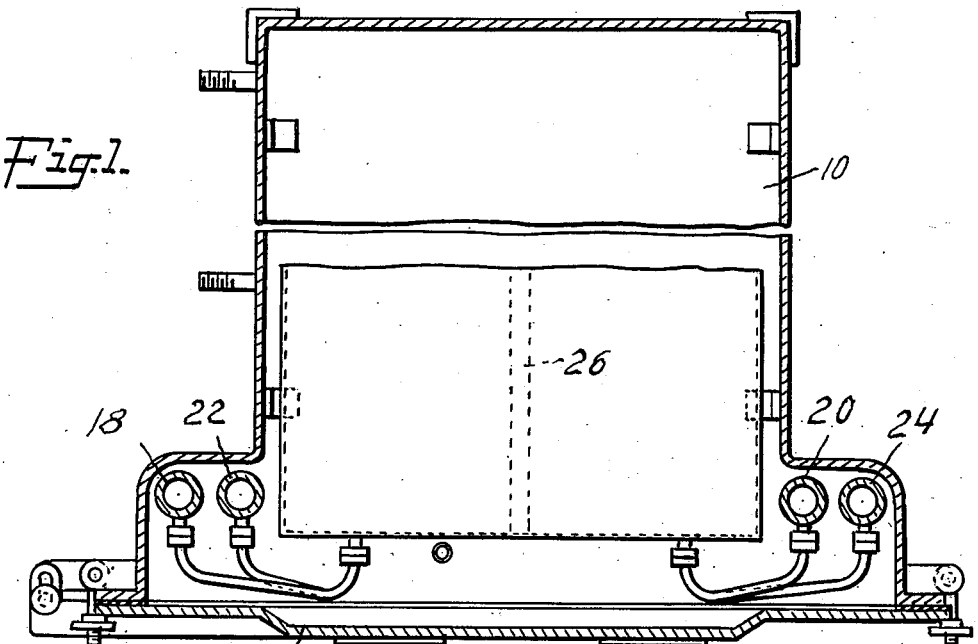
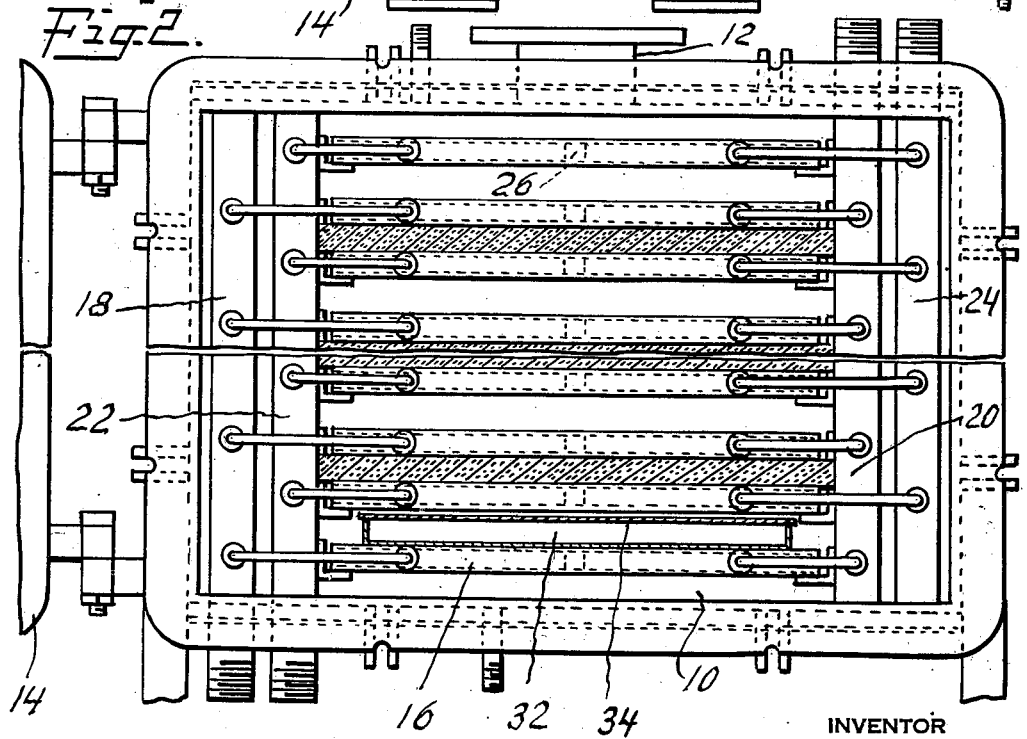
INVENTOR
Earl W. Flosdorf
BY
Connly, Edmonds, Morton and Barrows
ATTORNEYS Patented July 8, 1952

2,602,825

UNITED STATES PATENT OFFICE 2,602,825

SUBLIMATION PROCESS AND APPARATUS

Earl W. Flosdorf, Forest Grove, Pa., assignor to F. J. Stokes Machine Company, Philadelphia, Pa., a corporation of Pennsylvania Application January 24, 1948, Serial No. 4,132

7 Claims. (Cl. 260—706)

This invention relates to an improved process and an improved apparatus for the purification of certain chemical solids by sublimation. More particularly it relates to an improved process and an improved apparatus for the purification by sublimation under vacuum of sublimable substances, such as salicylic acid and benzoic acid, which are often required in a state of high purity, but which may be contaminated with non-volatile impurities, or which may be subject to decomposition if distilled under ordinary pressures.

Salicylic acid, as commonly produced, is obtained in impure form, which may contain as much as 0.5% phenol, small amounts, ranging from 0.1 to 0.2%, of inorganic sulfates and chlorides, traces of dicarboxy acids. Its color may be off white. It is a light, fluffy powder. Because the product is a therapeutic product, it is necessary that its purity be such as at least to meet the U. S. P. minimum requirements.

It has previously been proposed to purify such salicylic acid by sublimation, as, for example, placing the salicylic acid on heated shelves and collecting the sublimate in an adjoining drum. One such described operation uses a vacuum of 15 mm. and a 24 hour cycle, and gives a yield of about 80% per cycle, and with recycling of the remaining 20%, an ultimate yield which may approach 98%.

The present invention provides an improved process and apparatus for the purification of salicylic acid by sublimation which operates on a much shorter cycle and gives yields which approach 98% in a single cycle and eliminate the necessity for recycling. Additionally, breakdown of the acid to phenol and carbon dioxide through prolonged exposure to relatively high temperature is avoided. Purification of the product is more than adequate to comply with the requirements for the final product, analyses showing that all phenol is removed and that no chlorides, sulfates or other inorganic contaminants remain. In addition, the sublimate is a dense, compact material which is easily handled and has desirable physical form as compared with the light, fluffy, crude material.

In accordance with the present invention the crude salicylic acid is purified by the sublimation under a vacuum which is relatively high, that is, below 8 mm. and advantageously about 1 to 2 mm. or lower, and the travel path of the material in vapor form, that is, between the point where it is converted from a solid to vapor and the point where it is reconverted from vapor to solid is short, not exceeding 12" and advantageously being about 1" to 2". The operation is carried out in a vacuum chamber, provided with alternate heated and cooled horizontal plates, with the impure salicylic acid being placed upon a heated plate, and on application of the high vacuum subliming and being deposited on the under surface of the cooled plate immediately above. Advantageously, the procedure is carried out by placing the impure salicylic acid in a tray provided with a lid, in a layer of suitable thickness, for example, around 5/8", and inserting the tray and its lid between a lower heated plate and upper cooled plate in a vacuum chamber. By having a number of such alternating horizontal plates, suitably insulated one from the other, a number of trays of the impure acid can be treated simultaneously. The thermal contact between the tray itself and the heated plate upon which it rests and between the lid of the tray and the cooled plate which it underlies need not be extremely good because the actual amount of heat transfer is not great, and because it is a simple matter to have the temperature difference between the bottom of the tray and the lid more than adequate to provide for the necessary transference of the salicylic acid. When the sublimation is complete, and the salicylic acid is substantially all deposited upon the under surface of the lids of the trays, it is simple to remove the sublimed product, because it is dense and compact and adheres well to the lid, such that it is simply necessary to remove the trays from the vacuum chamber and lift off the lid and tap it so that the sublimate is caused to drop into a suitable receptacle.

The temperature of the heated plates and the cooling plates may be varied substantially, and in general, will be related to the pressure which is maintained within the vacuum chamber, such that the temperature of the heated plate is substantially above that corresponding to a salicylic acid vapor pressure equivalent to the pressure within the chamber, and the cooled plate is maintained well below that temperature. Excellent results are obtained by heating the hot plates with saturated steam at a pressure of about 40 to 50 pounds per square inch and cooling the other plates by water at 40 to 50° F. although cooling temperatures about as high as 100° F. may be used. Where the vacuum is relatively high, for example, 1 mm. or lower, lower temperatures than those corresponding to 40 to 50 pounds steam may be used for the heated plates. Excessively high temperatures should not be used for the heating medium for the heated plates to avoid decomposition of the salicylic acid to phenol and carbon dioxide, which starts at about 130° C., although it is slow at this temperature. Of course, instead of heating the plates by steam, other heating media may be used or the plates may be heated electrically. Similarly, any suitable cooling media may be used for the cooling plates. In view of the proximity of the heated and cooled plates it is advisable to separate them by suitable insulating material.

The invention will be further described in connection with the appended drawing which illustrates one form of apparatus which embodies the invention and may be used with advantage for the practice of the process of the invention in which:

Fig. 1 is a front view in section partly broken away of a vacuum chamber apparatus, and Fig. 2 is a bottom view of the vacuum chamber apparatus of Fig. 1 partly in section and partly broken away.

In the apparatus illustrated, there is provided a vacuum chamber 10, with a suitable vacuum outlet 12 and door 14. Within the chamber are positioned horizontally a series of plates, of which alternate ones, commencing with the lower plate 16, are connected to the hot water manifolds 18 and 20, while the others are connected to the cold water manifolds 22 and 24. Each of the hollow plates is advantageously provided with internal baffles 26 to provide for even distribution of the heating or cooling medium throughout its hollow space. The bottom of the vacuum chamber may, if desired, serve as the lowest heated plate. The plates do not fit tightly in the chamber, or are provided with apertures, to permit ready evacuation of the entire chamber. Advantageously, the underside of a cooled plate is about 1.25" from the top surface of the next lower heated plate although this distance may be more or less and may be several inches, e. g., 3 or 4 or 5 inches or even more. It should not exceed 12 inches. Upon each of the heated plates rests a pan 32, provided with a lid 34. The depth of each pan is such that when the pan is in place between a heated and a cooled plate, the lid is in loose sliding contact with the undersurface of the cooled plate, so that there is opportunity for removal of heat from the lid to provide for the condensation of the vapor, while providing for the establishment of the required low pressure within the pan. The lids merely rest upon the pans, and so permit the escape of any air which the pans may contain at the time the chamber is evacuated.

Advantageously the heated plates are heated with saturated steam at a pressure of about 50 pounds per square inch and the cooling plates are cooled with water at about 40 to 50° F., although the temperature of the cooling water may be as high as about 100° F. The apparatus, or at least, such parts of it as may be exposed to the salicylic acid, in vapor or solid form, is, of course, constructed of material suitably resistant to salicylic acid, such as stainless steel.

In operation of the apparatus illustrated, a layer of crude salicylic acid about 5/8" in depth is placed in each tray, the trays are inserted in the vacuum chamber, the door is closed, the heating medium is circulated through the heated plates and the cooling medium through the cooled plates. The chamber is then evacuated with any suitable vacuum pump, such as a mechanical pump, to a pressure below 8 mm., advantageously around 1 to 2 mm. or lower. Under such conditions sublimation is completed in about 1½ hours or less. The vacuum within the chamber may then be broken and the trays removed. The sublimate adheres well to the lids of the pans, and is collected as a dense, compact product by simply tapping each of the lids and collecting the sublimate which then drops off in a suitable receptacle.

One of the advantages of this apparatus is that if there is any air leakage into the vacuum chamber, causing a moving current of air within the chamber, it will not blow any of the fluffy, crude acid from its supporting pan or tray to the points of collection, thus avoiding one of the major difficulties in other types of subliming apparatus, in which there is a decided tendency for impure material to be carried along with the acid vapor and deposited at the point of its condensation with resulting contamination of the sublimate. Apparatus heretofore suggested to avoid this difficulty have been inefficient because any baffling or filtering means adequate to remove entrained, as distinguished from sublimed, acid, seriously interferes with the efficiency of the operation.

The improved apparatus and process of this invention may be readily adapted to the purification of benzoic acid by sublimation. Pure benzoic acid has a melting point of 122° C., and to meet the U. S. P. specifications must be a white powder having a minimum assay of 99.5% on a dry basis and an ash content of 0.05% maximum. It must dissolve in 10% sodium carbonate solution to give a clear and colorless solution.

Benzoic acid begins to sublime at approximately 90° to 100° C., and boils at 249° C. As a preliminary step, it is advisable to dry the material. This can be conveniently done with the trays loaded with benzoic acid in position for sublimation by utilizing mild conditions of temperature and reduced pressure without effecting sublimation and by initially maintaining the condensing surfaces warm, either by closing off the cooling water supply or by circulating warm water. The moisture taken off under the conditions of low pressure passes through the vacuum pumps or may be condensed in a secondary water condenser.

For the purification of benzoic acid, the equipment is advantageously constructed of aluminum. An operation conducted at a temperature of 180° to 190° F., with steam under a pressure of about 15 pounds per square inch is illustrative. The vacuum for this operation may be about 2 mm., and the water cooling temperature on the condensing plates about 58° F. Layers of crude benzoic acid about ¾" deep constitute the charge, and the sublimation cycle is somewhat longer than with salicylic acid; e. g., 7½ hours. Similarly, the procedure and apparatus described may be adapted to the purification of other sublimable substances which present analogous problems.

I claim:

1. Apparatus adapted for purification by sublimation including a vacuum chamber, a plurality of plates horizontally positioned within said chamber, each of said plates presenting a continuous surface heating means for heating alternate plates, cooling means for cooling the remaining plates, and pump means for evacuating said chamber.

2. Apparatus as in claim 1, further provided with pans with lids, the pans being of such depth that, when resting on a heated plate, the lid is in sliding contact with the cooled plate above it.

3. Apparatus as in claim 2, in which the means for heating the alternate plates, and cooling the other plates, includes hollow spaces in said plates through which heat exchange media may be circulated, together with means for supplying a heated medium to the heated plates and a cooling medium to the other plates.

4. Apparatus as in claim 3, in which each cooled plate is about 1¼" above the heated plate immediately below it.

5. The process of purifying by sublimation a sublimable comminuted substance which includes placing the impure comminuted substance in pans provided with tops, not more than 12 inches from the substance within the pan, placing at least one such tray in a chamber, reducing the pressure in the chamber to below 8 mm., heating the bottoms of the pans sufficiently to heat the substance to a temperature sufficiently high to cause it to sublime at said pressure, cooling the tops of the trays below the temperature at which the vapor pressure of the sublimable substance is equal to said pressure, whereby the material sublimes from each said layer in each pan condenses in solid form on each of said pan tops, and the path of travel of the vapor does not exceed 12 inches.

6. The process as in claim 5, in which the pressure does not exceed 2 mm.

7. The process as in claim 6, in which the path of travel of the vapor does not exceed about 2 inches.

EARL W. FLOSDORF.

REFERENCES CITED

The following references are of record in the file of this patent:

UNITED STATES PATENTS

| Number | Name | Date |
| --- | --- | --- |
| 1,450,464 | Thompson | Apr. 3, 1923 |
| 1,538,957 | Smith | May 26, 1925 |
| 1,970,956 | Elser | Aug. 21, 1934 |
| 2,211,026 | Pemberton | Aug. 13, 1940 |
| 2,292,447 | Irwin | Aug. 11, 1942 |
| 2,434,003 | Morrison | Jan. 6, 1948 |

OTHER REFERENCES

Ede: "Effect of Shape of Operating Chamber in the Freeze-Drying Process," Nature, vol. 159, May 3, 1947, page 610.